Figure 3:
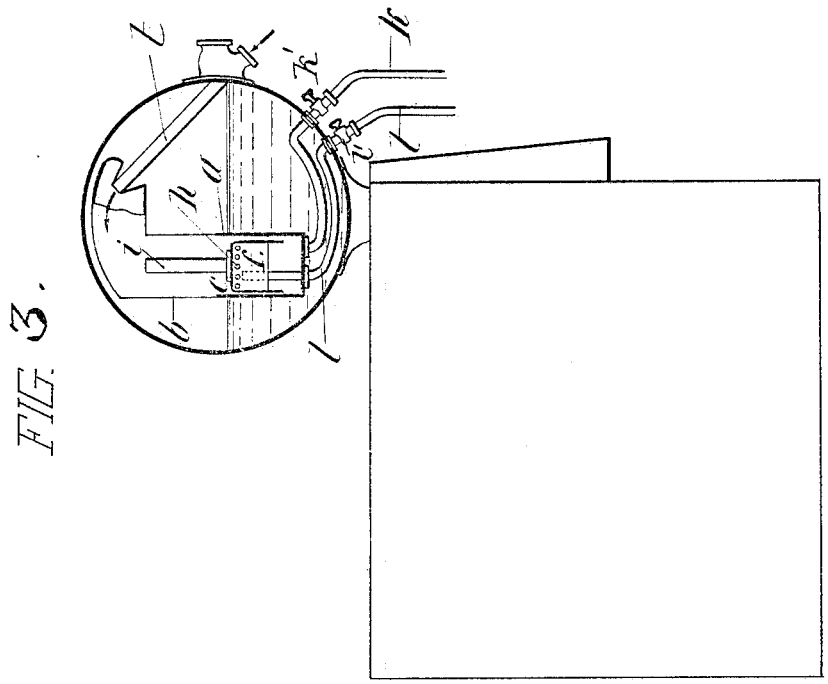

No. 801,679. PATENTED OCT. 10, 1905.
J. & A. NICLAUSSE.
SEPARATOR FOR LIQUIDS OF DIFFERENT DENSITY.
APPLICATION FILED JAN. 23, 1904.
3 SHEETS—SHEET 1.
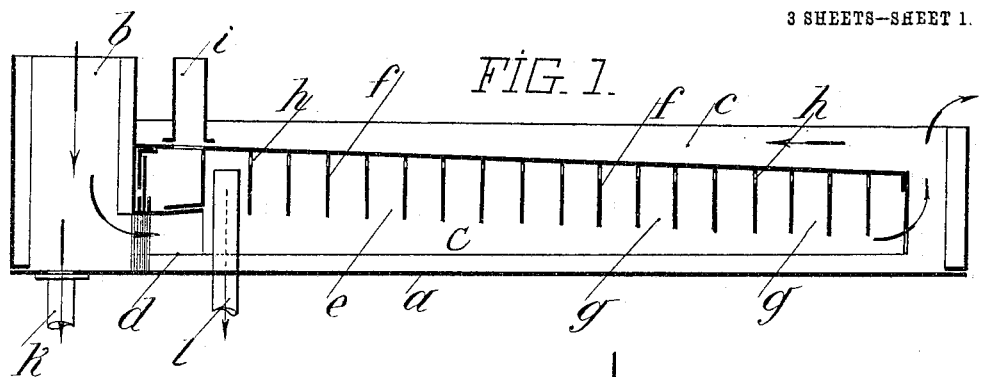
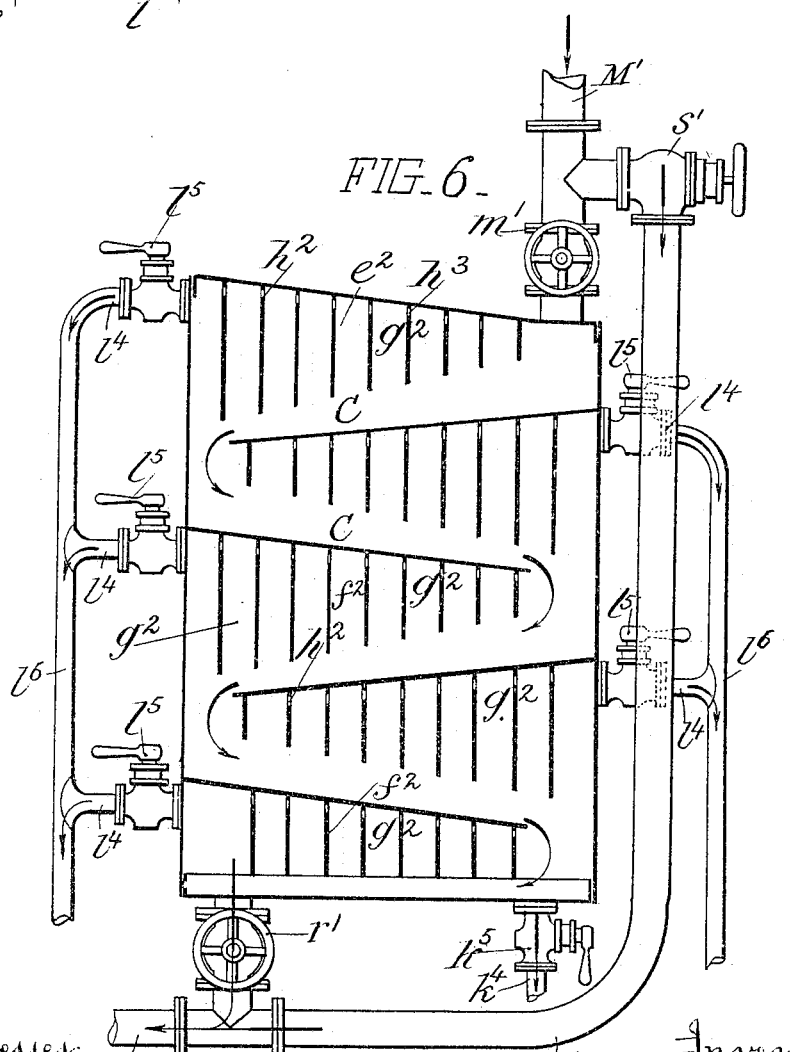

No. 801,679. PATENTED OCT. 10, 1905.
J. & A. NICLAUSSE.
SEPARATOR FOR LIQUIDS OF DIFFERENT DENSITY.
APPLICATION FILED JAN. 23, 1904.

3 SHEETS—SHEET 2.

Witnesses:

Inventors:
Jules Niclausse,
Albert Niclausse,
by George F. Massie
their Attorneys.

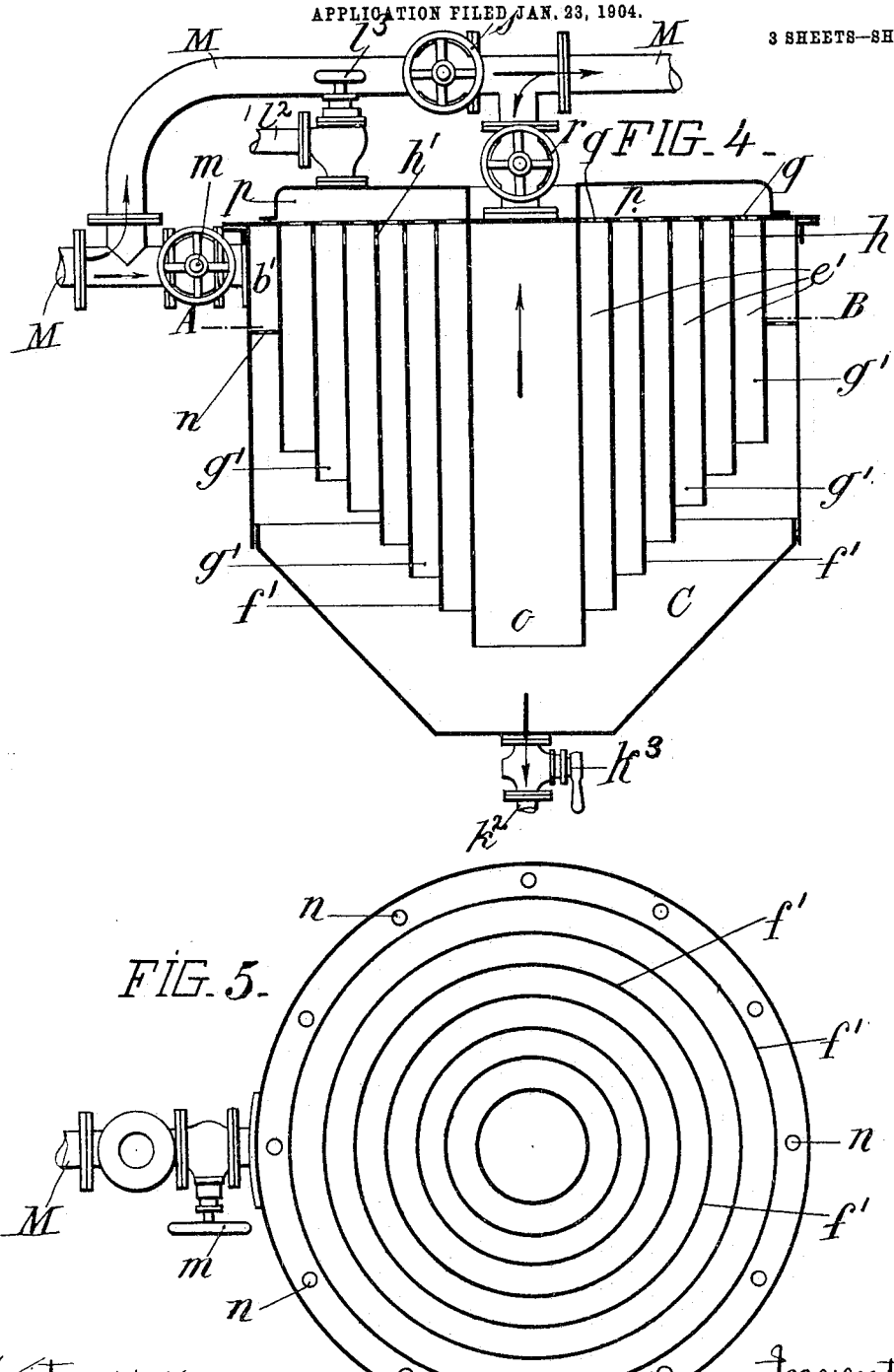

UNITED STATES PATENT OFFICE.

JULES NICLAUSSE AND ALBERT NICLAUSSE, OF PARIS, FRANCE.

SEPARATOR FOR LIQUIDS OF DIFFERENT DENSITY.

No. 801,679.     Specification of Letters Patent.     Patented Oct. 10, 1905.

Application filed January 23, 1904. Serial No. 190,358.

*To all whom it may concern:*

Be it known that we, JULES NICLAUSSE and ALBERT NICLAUSSE, citizens of the Republic of France, residing at 24 Rue des Ardennes, Paris, France, have invented a new and useful Improvement in Separators for Liquids of Different Density, which improvement is fully set forth in the following specification.

The present invention relates to separators for mixtures of liquids of different densities, one application of such separators being the separation of oil from water.

The present invention has for its object an apparatus in which the separation of such liquids can be speedily effected with sufficient completeness to be effective.

This invention, though the same may be utilized for separating a great variety of liquid mixtures, is particularly applicable to the separation of engine-lubricating oils from water of condensation from steam-engines, so as to adapt said water for again serving to feed the steam-boilers.

An apparatus constructed according to this invention will be of particular utility in the following two classes of cases: first, for the separation within steam-boilers of oils or fatty matters introduced into said boilers with the feed-water; second, for the separation at the outside of such steam-boilers of the oil or fatty matter from the water of condensation serving as feed-water, this construction being especially adapted for marine engines and serving as a substitute for the filters now in use.

For the purpose of attaining the above objects an apparatus embodying our invention comprises a conduit for the liquids to be separated, combined with a casing having a series of compartments transverse to and opening at their bottoms into said conduit, and preferably communicating at their upper portions, and means for maintaining the level of the liquid passing through the conduit within said compartments, preferably at the top of the same. Said compartments are preferably formed by a series of partitions, preferably vertical, or substantially so, and reaching down into the conduit. Means are provided for drawing off the lighter fluid—for example, the oil—as it accumulates in the upper part of the compartments and also for draining the separator entirely when it is desired to clean the same. In some cases means may also be arranged for causing the liquid to flow by the separator, and, in the case of feed-water, directly into the boiler, if such be desired.

Other features of our invention will be set forth below and pointed out in the claims.

In the drawings accompanying this specification we have shown several forms of separators embodying our invention.

Figure 2:
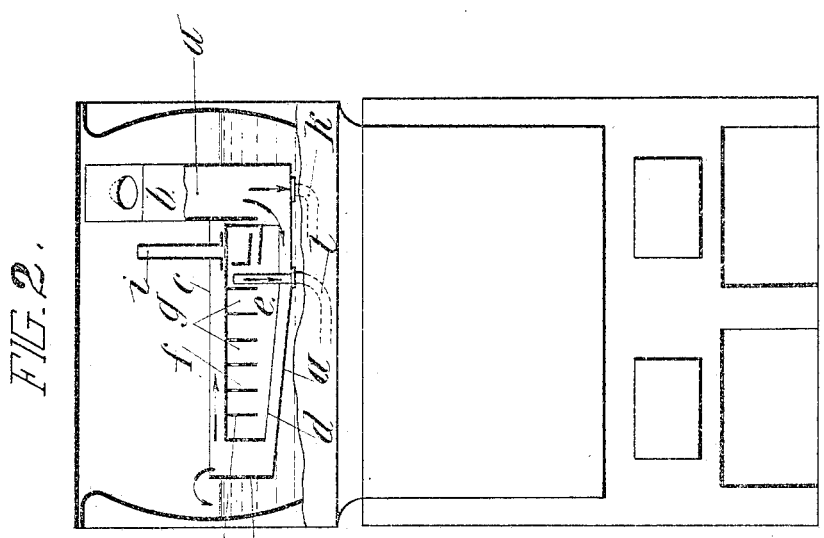

In the drawings, Figure 1 represents a longitudinal vertical section of a separating apparatus according to our invention; Fig. 2, a side elevation of a steam-boiler, partly in vertical section, showing such separating apparatus in position in said boiler; Fig. 3, an end elevation of the same, the upper part of the boiler in which the separating apparatus is located being again shown in vertical section; Fig. 4, a vertical central section of another form of separating apparatus under our invention; Fig. 5, a horizontal section of the same, and Fig. 6 a vertical section of still another form of separating apparatus embodying our invention.

Referring first to Figs. 1, 2, and 3, it will be noted that these represent an apparatus made under this invention which serves for separating oil from feed-water after the introduction into the boiler. This apparatus is formed of a sheet-iron box $a$, usually divided into compartments $b$ and $c$, which communicate with each other by an opening $d$, prolonged in the form of a passage. The two compartments $b$ and $c$ are entirely open at the top. In the compartment $c$ is placed a box or casing $e$, open at the bottom. It is divided into compartments $g$ by a series of vertical sheet-metal partitions $f$, the compartments communicating with each other through holes or perforations $h$ formed at the top of the partitions $f$. The partitions, which are usually of different lengths, are arranged in stages in such a manner as to, so to speak, meet with the oils or the fatty bodies of less density which are mixed in the different portions of the liquid and which it is desired to separate. The top of the box $e$ and the line of perforations $h$ slope upward toward the pipe $i$, which is fixed to the upper part of the box $e$. The perforations $h$ are arranged each somewhat higher than the one next preceding, so as to give the line of perforations a slope slightly upward, as for the top of box $e$. $k$ is the pipe fixed to the outer metal shell of the boiler and which serves to completely empty the apparatus. Fixed to the outer shell of the boiler is another pipe $l$, which serves to extract the oil which accumulates in the upper part of the box $e$ without being obliged to empty the whole of the separator. Means are provided for maintaining the level of the liquid to be separated substantially in the top of the compartments $g$. This is accomplished by having the upper rims of the sides of chamber $c$ located above the casing $e$. This upper rim is also slightly above the normal water-level in the boiler, as shown in Figs. 2 and 3. The apparatus is mounted and arranged in the boiler, as shown in Figs. 2 and 3. Its operation is as follows: All the feed-water for the boiler passes through the apparatus, entering through pipe $t$, connected with the feed-water pump, passing first into chamber $b$, whence it passes into the compartment $c$ through the orifice $d$. The oil thus passes through a conduit, over which are arranged the compartments $g$, which open into said conduit at their bottoms. Any oil floating on the top of the water passing through such conduit is stopped by the partitions $f$ of the compartments $g$, along which it rises, by reason of its lesser density, and passing from one compartment to the next in series through the holes $h$, by reason of the sloping arrangement of said series of holes, travels toward the upper open end of pipe $l$ leading to an oil-tank. A pipe $i$ connects the top of box $e$ with the interior of the boiler in order to maintain equal pressures in the boiler and in the box $e$. A pipe $k$, opening at the bottom of box $e$ and passing through the boiler-shell, serves for completely emptying the apparatus and drawing off the sediments. Both pipes $k$ and $l$ are preferably provided with cocks $k'$ and $l'$. (Shown in Fig. 3.) By opening the cock on pipe $l$ one may draw off the oil from the separator without emptying the compartment $e$.

The feed-water being thus freed from oil and other impurities of lesser density flows over the brim of the compartment $c$ into the steam-generating space of the boiler.

In Figs. 4, 5, and 6 are shown two modifications under our invention. These modified forms of separators serve to separate the oil from the feed-water before the same enters the boiler.

Referring first to Figs. 4 and 5, it will be noted that the separator there shown is so arranged that it may be included in or cut out from the feed-water service-pipe M by means of inlet and exit cocks $m$ and $r$, respectively. When the separator is included in the service-pipe M by opening the cocks $m$ and $r$, the water charged with oil passes through cock $m$ into an annular space $b'$, the bottom of which is pierced with holes $n$ for the purpose of distributing the liquid equally throughout the apparatus. It will be noted that here again the liquid passes through a conduit over which are arranged vertical compartments opening at the bottoms into the conduit. $o$ is the outlet-pipe for the liquid. When the liquid flows from $b'$ to $o$, the oil, by reason of its lesser density, remains in the compartments $g'$, which in this case are annular and concentric to the space or chamber $b'$ and where the liquid remains almost untroubled. It rises rapidly along the partitions $f'$, dividing the casing $e'$ into the annular compartments $g'$, which communicate with each other through the perforations $h'$. The separation of the oil from the water is further helped by the great extent of surfaces which the mixture of the two liquids meets with in its passage past the partitions, the effect of which is to accumulate the oil on the surfaces, from which it from time to time becomes detached in the form of large drops or globules, which, by reason of their greater volume, ascend more rapidly, as will be readily understood. The perforations or holes $h'$ are in this modification not arranged in a sloping line; but, in order to collect the oil accumulating in the various compartments $g'$, they also communicate, through the holes $q$, with a space $p$. From this space the oil collected and extracted from the apparatus while working is drawn off as required through pipe $l^2$ by opening the cock $l^3$. $k^2$ is a pipe through which the apparatus may be completely emptied by opening the cock $k^3$. $r$ is the cock for allowing the outlet of the water from the apparatus through the outlet $o$ into the feed-water service-pipe M and thence to the boiler. $s$ is a cock which when opened allows the liquids to flow outside and around the apparatus, which can then be cut off by means of the cock $m\ r$, as explained above.

In Fig. 6 is shown a multiple or terraced apparatus of parallelopiped shape the principle of which is the same as those described above, although the form is somewhat modified. The apparatus consists of five separators arranged one above the other. The liquid charged with oil enters from the service-pipe M' through the cock $m'$ into the first separator and passes successively from one separator to a lower separator in the direction of the arrows. Each of these separators, it will be noted, is constructed in a similar manner to that represented in Fig. 1. There is in each a casing $e^2$, divided into a series of preferably vertical compartments $g^2$ by a series of preferably vertical partitions $f^2$, said compartments being arranged transversely to and opening at their bottoms into the conduit C. Each partition $f^2$ is again provided with a perforation $h^2$, each line of perforations being again arranged at a slope (by making each succeeding perforation somewhat higher than the one preceding it,) so that the oil accumulating in the compartments gradually accumulates at the top of the farthermost compartment following the highest perforation where a drain-pipe $l^4$, provided with a cock $l^5$, communicates with said compartment. As shown, a number of such drain-pipes $l^4$ are connected to a common drain-pipe $l^6$, two of which are shown in the present instance. As in the construction shown in Figs. 4 and 5, the separator can, in the present case, be cut off from or included in the feed-water service-pipe M' by closing the inlet-cock $m'$ and exit-cock $r'$ or opening the same. In the former case the cock $s'$ is opened to permit the feed-water to pass around the separator into the boiler, and in the latter case it is closed to cause all of said feed-water to pass through the separator. There is also a waste-pipe $k^4$ at the bottom of the apparatus, through which the same may be completely emptied by opening the cock $k^5$.

From the above description it will be noted that in a separator constructed according to this invention the liquid to be separated passes through a conduit C, which may be substantially horizontal or inclined, but never vertical, the said liquid being intercepted in its flow by a series of preferably vertical partitions which are transverse to the conduit and which extend into such conduit at their bottoms, said partitions dividing a casing arranged above the conduit into a series of compartments transverse to and opening into the conduit. The said compartments communicate at their upper portions with a pipe for drawing off the lighter liquid as it accumulates. Such communication is effected in the present case by perforations at the upper portion of the partitions, said perforations being, under one form of construction, arranged in a sloping line, the highest perforation being toward the pipe for drawing off the said lighter liquid, or, as in the construction shown in Fig. 4, the tops of the compartments all communicate by perforations with a collecting-chamber, forming part of and arranged at the top of the casing, to which collecting-chamber the draw-off pipe is in turn connected. The casing $e$, $e'$, or $e^2$ is preferably, though not necessarily, closed at the top. Means are in all cases provided for keeping the level of the liquid within and preferably at the top of the compartments. These means, in Figs. 1 and 4, consist in an exit for the liquid after it passes through the separator arranged above the top of the chambers or casing.

Having thus fully described our invention, what we claim as new, and desire to secure by Letters Patent of the United States, is—

1. In an apparatus for separating liquids of different densities, a conduit for the liquids to be separated, in combination with a casing having a closed top and divided into compartments, communicating with the conduit, by a series of partitions arranged transversely to the conduit and having perforations near the top of the casing, and means for maintaining the level of the liquid substantially at the top of the compartments.

2. In an apparatus for separating liquids of different densities, a conduit for the liquids to be separated, in combination with a casing having a closed top and divided into compartments communicating with the conduit by a series of vertical partitions arranged transversely to the conduit and having perforations near the top of the casing, and means for maintaining the level of the liquid substantially at the top of the compartments.

3. In an apparatus for separating liquids of different densities, a conduit for the liquids to be separated, in combination with a casing closed at the top and divided into compartments by partitions transverse to and extending down into the conduit, said partitions being provided at their upper portions with perforations arranged in a sloping line.

4. In an apparatus for separating liquids of different densities, a conduit for the liquids to be separated, in combination with a casing closed at the upper portion by a sloping top and divided into compartments transverse to the conduit by partitions extending down into the conduit, said partitions being provided at their upper portions with perforations arranged in a sloping line.

5. In an apparatus for separating liquids of different densities, a conduit for the liquids to be separated, in combination with a casing closed at the upper portion by a sloping top and divided into compartments transverse to the conduit by partitions extending down into the conduit, said partitions being provided at their upper portions with perforations arranged in a sloping line, and a pipe to draw off the lighter liquid accumulated in the compartment arranged in advance of the highest perforation.

6. In an apparatus for separating liquids of different densities, a conduit for the liquids, a casing above the said conduit, a series of partitions of graduated lengths in said casing forming compartments communicating with the said conduit, means for drawing from said compartments the lighter liquid collected therein, and an outlet for the conduit.

7. In an apparatus for separating liquids of different densities, a conduit for the mixed liquids, a series of partitions of graduated lengths forming separating compartments communicating with the said conduit, means for drawing from said compartments the lighter liquid collected therein, and an outlet from the conduit for the heavier liquid.

8. In an apparatus for separating liquids of different densities, a conduit through which the mixed liquid is admitted, an upper conduit through which the lighter liquid may be withdrawn, an outlet from the lower conduit for the heavier liquid, and a series of partitions transverse to both conduits and communicating therewith to form separating compartments for the arrest and collection of the lighter liquid.

In testimony whereof we have signed this specification in the presence of two subscribing witnesses.

JULES NICLAUSSE.
ALBERT NICLAUSSE.

Witnesses:
PAUL F. PÂQUET,
JEAN PIERRE ETIENNE VAUCHER.